US008479570B2

(12) United States Patent
Huttner

(10) Patent No.: US 8,479,570 B2
(45) Date of Patent: Jul. 9, 2013

(54) FIXTURE FOR MEASURING THE DRAG OF A PISTON RING IN AN ENGINE CYLINDER AND METHODS OF USE THEREOF

(76) Inventor: Timothy Huttner, Dayton, MN (US)

( * ) Notice: Subject to any disclaimer, the term of this patent is extended or adjusted under 35 U.S.C. 154(b) by 306 days.

(21) Appl. No.: 12/959,958

(22) Filed: Dec. 3, 2010

(65) Prior Publication Data

US 2011/0132079 A1 Jun. 9, 2011

Related U.S. Application Data

(60) Provisional application No. 61/283,412, filed on Dec. 3, 2009.

(51) Int. Cl.
*G01M 15/02* (2006.01)
(52) U.S. Cl.
USPC ..................................................... 73/114.78
(58) Field of Classification Search
USPC ............... 73/114.26, 114.27, 114.28, 114.77, 73/114.78, 114.79, 116.02
See application file for complete search history.

(56) References Cited

U.S. PATENT DOCUMENTS

| 1,425,284 | A | | 8/1922 | Pratt |
| 1,760,518 | A | | 5/1930 | Okochi et al. |
| 2,019,287 | A | | 10/1935 | Bates |
| 2,047,607 | A | | 7/1936 | Zimmerman |
| 2,564,994 | A | | 8/1951 | Phillips et al. |
| 2,831,261 | A | | 4/1958 | Bunge |
| 3,889,528 | A | * | 6/1975 | Grikscheit et al. .......... 73/114.28 |
| 3,946,602 | A | * | 3/1976 | Huntington et al. ........ 73/114.78 |
| 5,007,284 | A | * | 4/1991 | Slone .......................... 73/114.78 |
| 5,377,421 | A | | 1/1995 | Isler |
| 5,548,901 | A | | 8/1996 | Isler |
| 5,979,071 | A | | 11/1999 | Kim |
| 6,196,063 | B1 | * | 3/2001 | Kasai et al. ................. 73/114.78 |
| 6,421,930 | B1 | | 7/2002 | Foster |
| 2005/0274255 | A1 | | 12/2005 | Hamilton |
| 2006/0131520 | A1 | * | 6/2006 | Wakatsuki ............... 250/559.29 |

* cited by examiner

*Primary Examiner* — Eric S McCall
(74) *Attorney, Agent, or Firm* — Seager, Tufte & Wickhem LLC

(57) ABSTRACT

A fixture for measuring the resistance of a piston ring in a cylinder, comprising an elongate member having a first end and a second end and a central axis extending therebetween, and an expandable platform attached to the second end of the stem, the platform having a top surface facing towards the first end, the top surface being perpendicular to the central axis, the top surface including first, second and third points movable radially outward from the central axis, and methods of use thereof.

19 Claims, 4 Drawing Sheets

FIXTURE FOR MEASURING THE DRAG OF A PISTON RING IN AN ENGINE CYLINDER AND METHODS OF USE THEREOF

FIELD OF THE INVENTION

This invention pertains to a tool or a fixture for more easily measuring the drag of a piston ring in a cylinder and methods of use thereof.

BACKGROUND

A piston ring is an open-ended or closed ring that fits into a groove on the outer diameter of a piston in a reciprocating engine such as an internal combustion engine or steam engine. The three main functions of piston rings in reciprocating engines are sealing the combustion/expansion chamber, supporting heat transfer from the piston to the cylinder wall., and regulating engine oil consumption. Rings may be gapless or gapped. The gap in a gapped piston ring compresses to a few thousandths of an inch when inside the cylinder bore.

Most automotive pistons have three rings: The top two while also controlling oil are primarily for compression sealing (compression rings); the lower ring is for controlling the supply of oil to the liner which lubricates the piston skirt and the compression rings (oil control rings). Typical compression ring designs will have an essentially rectangular cross section or a keystone cross-section. The periphery will then have either a barrel profile (top compression rings) or a taper form (second compression rings). There are some taper-faced top rings and on some old engines simple plain faced rings were used.

Oil control rings typically are of three types: (1) single piece cast iron, (2) helical spring backed cast iron or steel, or (3) multi-piece steel. The spring backed oil rings and the cast iron oil rings have essentially the same range of peripheral forms which consist of two scraping lands of various detailed form. The multi-piece oil control rings usually consist of two rails or segments (these are thin steel rings) with a spacer expander spring which keeps the two rails apart and provides the radial load.

During certain engine building , rebuilding or repair procedures, the resistance or drag of a piston ring in a cylinder bore is measured. In the typical prior art method, the piston ring is placed on the piston, which is then inserted into the cylinder bore. The piston is then attached to a spring weighing scale and pulled out of the piston. The resistance of the ring is related to the weight measurement on the scale. This can be an inconvenient or ungainly procedure and thus there is need for a fixture which allows a procedure which is more convenient and faster than the method described above.

SUMMARY

Embodiments pertain to fixtures and methods for performing a piston ring resistance test. An adjustable fixture is substituted for the piston and one or more piston rings are placed on the fixture, and the resistance of the rings is measured while the piston ring or rings is pulled out from the piston cylinder. A spring scale, strain gauge with digital readout or other suitable device is used to measure the resistance or drag caused by the piston ring.

One fixture according to an embodiment includes a stem for connecting a force measurement device to a platform for carrying one or more piston rings. The platform may include a central plate and a plurality of arms rotably connected to the central plate. The arms may be rotated outward to adjust the size of a piston ring carrying surface. The piston ring carrying surface is preferably flat, perpendicular to the stem and facing the stem. There may be two, three or more arms. The arms may be disposed in a radially symmetric fashion about the stem. The arms may have a thickness that is at least 0.3, 0.4, 0.45, 0.469, 0.5, or 0.6 inches. The arms may have a curved outer profile such as that of a circle arc segment or a French curve. The arms may be fixable in place after adjustment through the use of screws, a clamp or the like.

One method of use involves adjusting the arms of the fixture so that the fixture just fits within the particular cylinder bore that is part of the test. The outermost part of each arm should preferably extend a distance away from the central axis that is slightly less than the radius of the cylinder bore. Further, the outermost part of the arm should also extend far enough out from the central axis so that the arms can support the piston ring or rings being tested. This means that each arm should extend out from the central axis such that the outermost part of the arm is further away from the central axis than the inner radius of the piston ring. When adjusted properly there arms are able to support the piston cylinder while having a small gap between the arms and the cylinder bore when the fixture is inserted into the cylinder bore. When the arms are properly positioned, they may be fixed in place, by tightening the fasteners as appropriate. A piston ring is disposed on the piston ring support surface of the arms and the fixture is inserted within the cylinder bore. The fixture is pulled directly out through the cylinder bore while making readings using a force measurement device.

DETAILED DESCRIPTION

Figure 1:
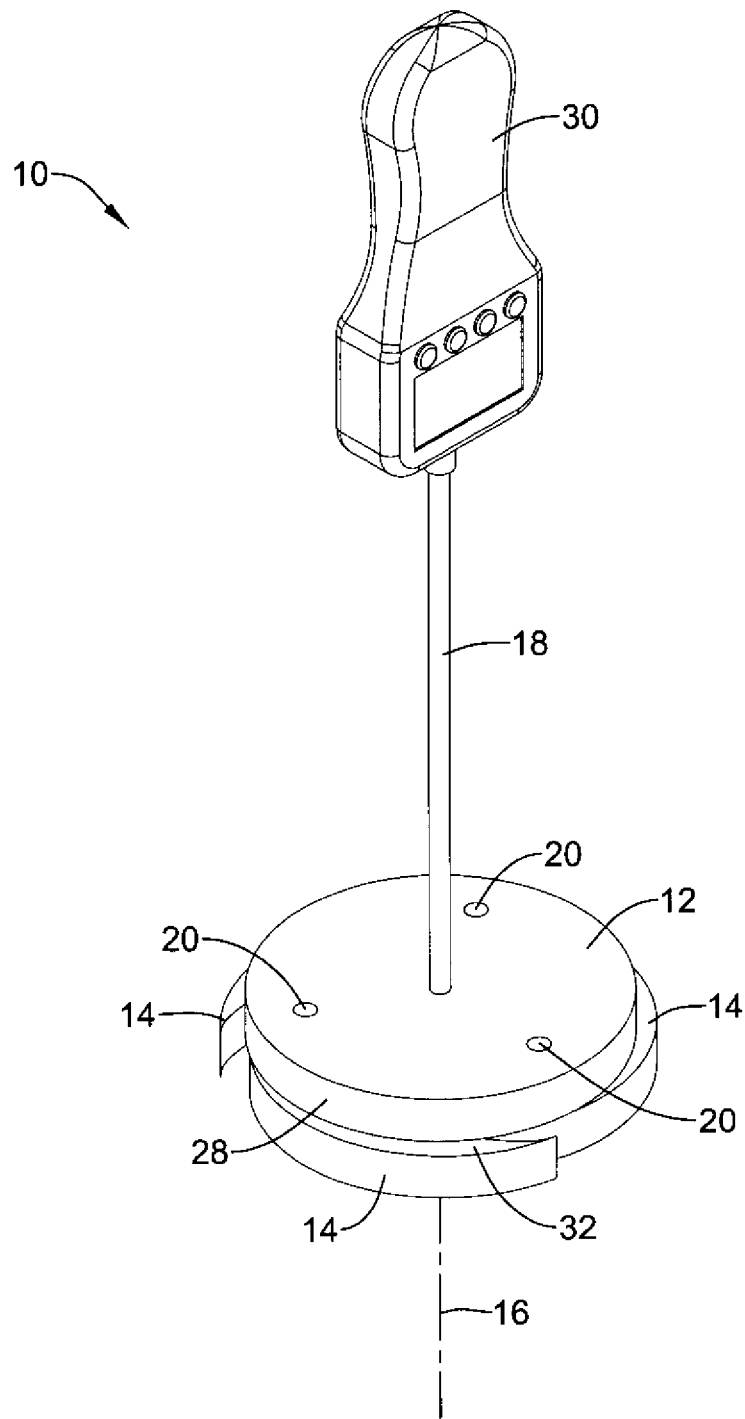
FIG. 1 is an isometric view illustrating a fixture 10 according to a first embodiment.

FIG. 1 illustrates a first embodiment of a fixture 10 for measuring the force or drag of piston rings in a cylinder bore. Fixture 10 may include a plate 12 have a plurality of arms 14 attached thereto. A central axis 16 runs through the center of and perpendicular to plate 12. A stem 18 is attached to plate 12 and preferably runs along the central axis 16. The arms 14 are preferably rotatably attached to plate 14 at points 20 by a screw, nut and bolt or other fastener that can be tightened and loosened.

A force measurement device 30 may be attached to the stem 18 opposite the plate 12. The force measurement device may be any suitable device that can measure force along axis 16. A digital device with a strain gauge and a spring scale are examples of suitable force measurement devices.

Figure 2:
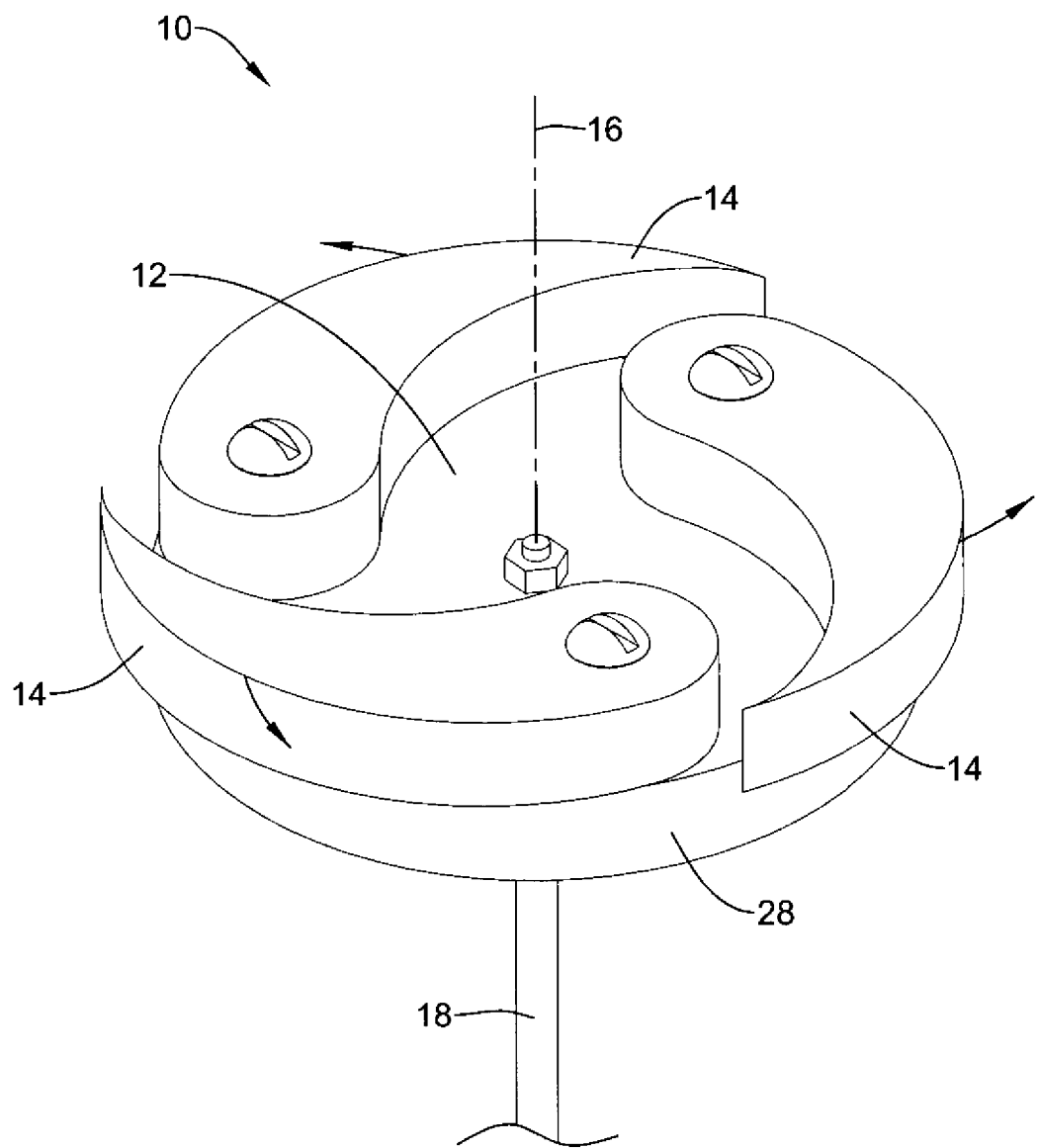
FIG. 2 is an isometric view of the bottom of fixture 10.

In the embodiment shown, there are three arms 14, and the three arms 14 are disposed in a radially symmetric fashion about the central axis 16. Each of the arms rotates about an axis that passes through a respective point 20 and which is parallel to the central axis 16. This allows the arms to rotate outwards as illustrated by the three arrows in FIG. 2 so that the arms 14 are nearer to or farther away from the central axis 16 as desired. The arms 14 collectively define a top surface 32. This surface is preferably flat and perpendicular to axis 16. The top surface 32 is used to support one or more piston rings during a measurement procedure. It can be appreciated that by adjusting the arms, piston rings of various sizes can be supported. The arms preferably have a curved outer profile. This curved outer profile may be in the shape of an arc segment of a circle or in the shape of a French curve. In the embodiment shown, the arms have an outer profile in the shape of an arc segment of a circle. The arms are arranged relative to each other such that there is a position of the arms where the outer profiles of the arms define portions of the same circle. While the embodiment shown illustrates three arms 14 arranged in a radially symmetric manner, it can be appreciated that in other embodiments there may be fewer or more arms and the arms need not be arranged in a symmetric fashion.

In the embodiment shown the arms 14 are attached to the plate using screws, bolts or the like, which are tightened or loosened as desired to allow for adjustment of the fixture. In another embodiment, the arms 14 are rotatably attached to the plate 12 tightly enough so that the arms 14 stay in place but where the arms may be adjusted without adjusting the fasteners. In other words, in this contemplated embodiment, there may be a degree of friction between the arms 14 and the plate that may be overcome manually to adjust the position of the arms.

The stem 18 may be a rigid elongate element as shown in the figures or may be a flexible element such as a chain.

The plate 12 and arms 14 may have each have a thickness. For example, the plate 12 may have a thickness that is at least 0.3, 0.4, 0.45, 0.469, 0.5, or 0.6 inches and each of the arms 14 may have a thickness that is at least 0.3, 0.4, 0.45, 0.469, 0.5, or 0.6 inches. Each of the arms 14 preferably has the same thickness and the arms 14 may or may not have the same thickness as the plate 12. The outer profile 28 of the plate 12 may extend parallel to axis 16. In one preferred embodiment, the plate has a circular outer profile. The outer profiles of the arms 14 may also extend parallel to axis 16. The shapes of the plate 12 and arms 14 together with their thickness may effectively orient the fixture properly within the cylinder bore.

Figure 3:
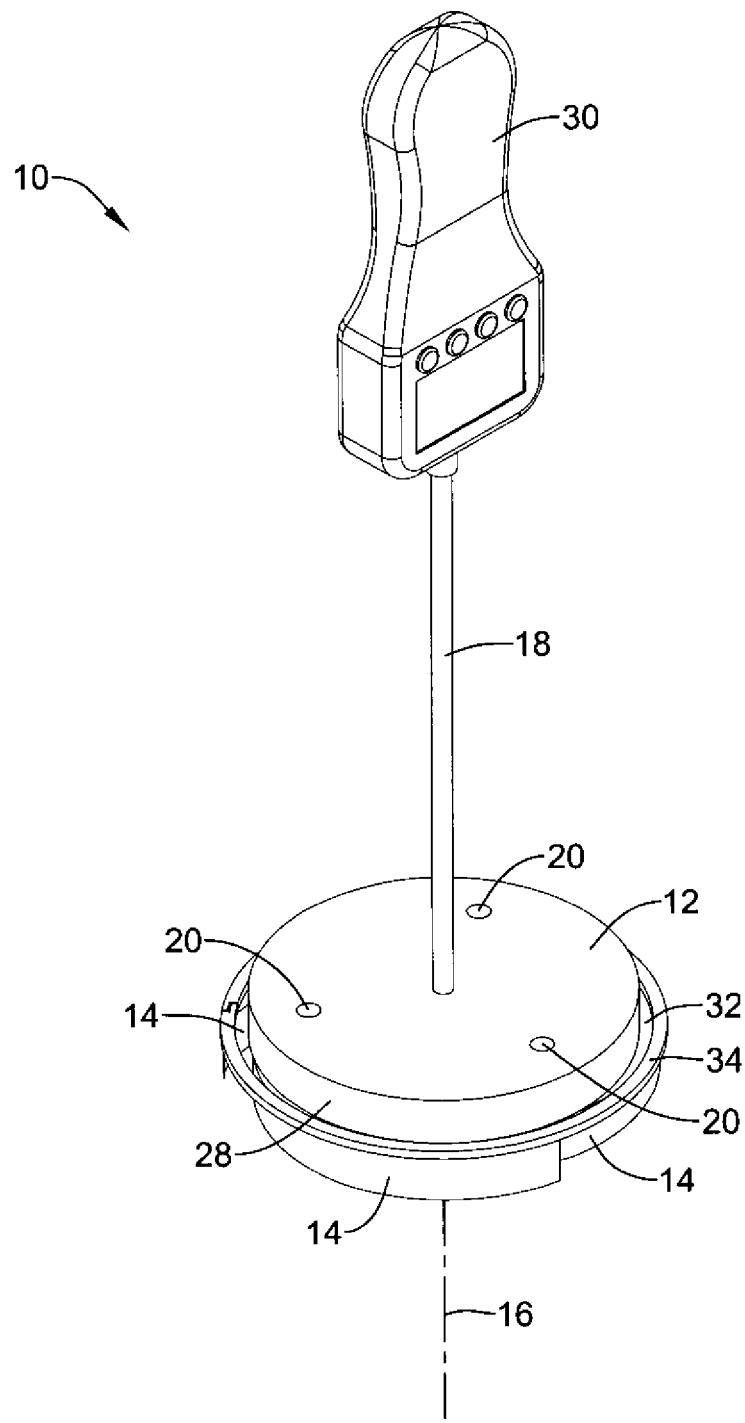
FIG. 3 is a view of fixture 10 having a piston ring disposed thereon.
Figure 4:
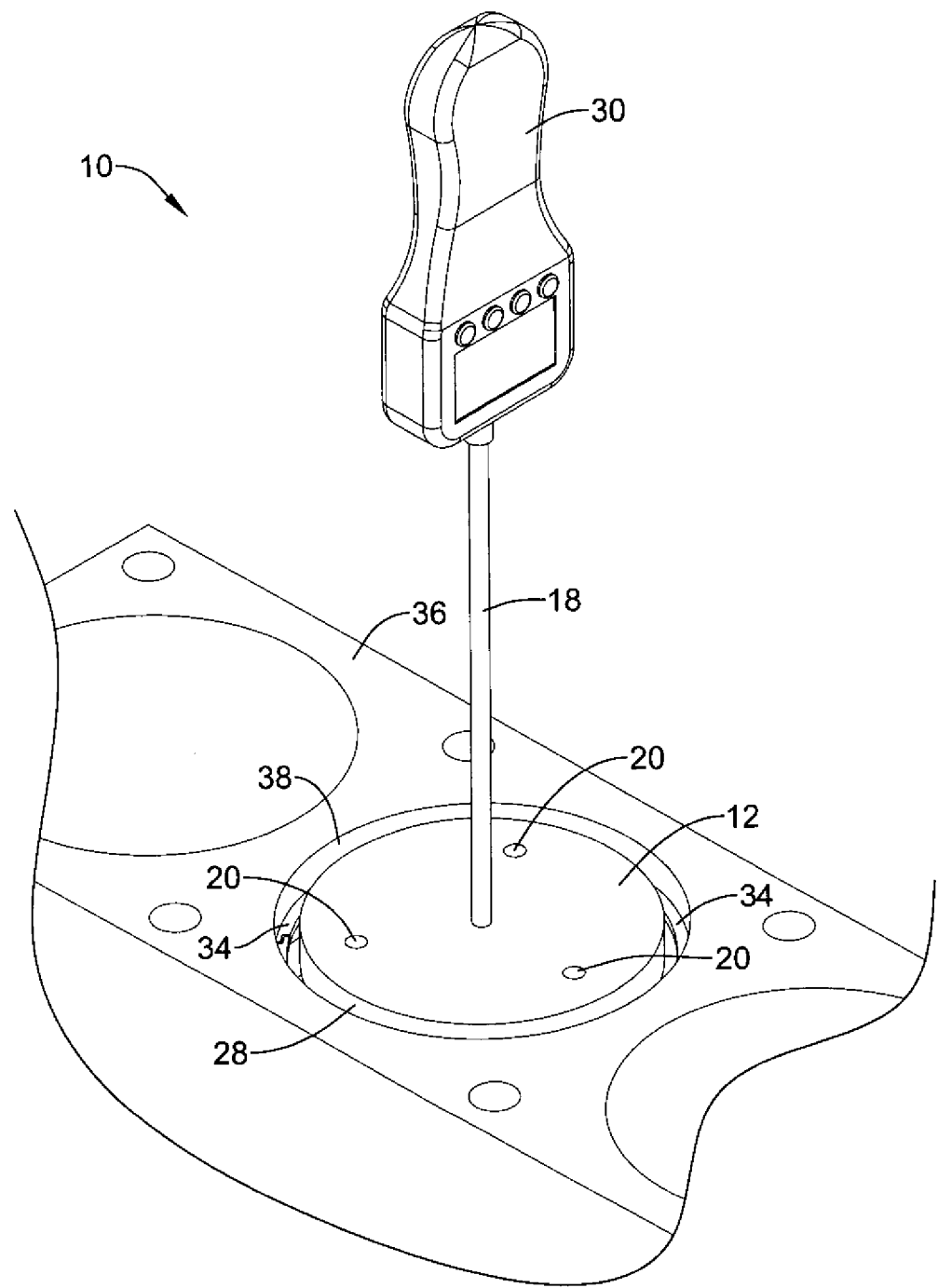
FIG. 4 illustrates fixture 10 having a piston ring thereon and disposed in a cylinder bore.

With reference to FIGS. 3 and 4, in use, the arms 14 may be adjusted to just fit within the particular cylinder bore 38 of the engine block 36 that is part of the test. The outermost part of each arm 14 should preferably extend a distance away from the central axis 16 that is slightly less than the radius of the cylinder bore 38. Further, the outermost part of the arm 14 should also extend far enough out from the central axis 16 so that the arms 14 can support the piston ring 34 being tested. This means that each arm 14 should extend out from the central axis 16 such that the outermost part of the arm 14 is further away from the central axis 16 than the inner radius of the piston ring 34. The idea is to support the piston ring 34 with the arms 14 while being able to have a small gap between the arms 14 and the cylinder bore 38 when the fixture 10 is inserted into the cylinder bore 38. When the arms 14 are properly positioned, they may be fixed in place by tightening fasteners as appropriate. The fixture 10 may be attached to a force measuring device 30. A piston ring 34 may be disposed on the top surface 32 of the arms 14 and the fixture 10 is then inserted within the cylinder bore 38. The fixture 10 may then be pulled through the cylinder bore 38 along axis 16 while making readings using the force measurement device 30.

In another example method of adjusting the arms, the arms may be adjusted so S that the outermost tips of the arms are within the ring created by two circles, the first circle having a diameter equal to the outer diameter of the piston ring and the second circle having a diameter having a diameter equal to the inner diameter of the piston ring. Such a method may allow one to adjust the arms on a template, for example.

In another method of use, two or three piston rings 34 are stacked on the top surface 32 of arms 14, and the process of measurement as described above is made while the several rings 34 are on the fixture.

There have been described and illustrated herein several examples of a fixture and methods of use thereof. While particular embodiments and applications of the invention have been described, it is not intended that the invention be limited thereto, as it is intended that the invention be as broad in scope as the art will allow and that the specification be read likewise. Thus, while particular dimensions and configurations have been disclosed, it will be appreciated that others could be utilized. It will therefore be appreciated by those skilled in the art that yet other modifications could be made to the provided invention without deviating from its spirit and scope as so claimed.

What is claimed is:

1. A fixture for measuring the resistance of a piston ring in a cylinder, comprising:
    an elongate member having a first end and a second end and a central axis extending therebetween;
    an expandable platform attached to the second end of the elongate member, the platform having a top surface facing towards the first end, the top surface being perpendicular to the central axis, the top surface including first, second and third points movable radially outward from the central axis; and
    a force measurement device attached to the first end of the elongate member.

2. The fixture of claim 1 wherein the platform has an outer edge that is parallel to the central axis and which has a thickness of at least 0.3 inch.

3. The fixture of claim 1, wherein the force measurement device is a digital force measurement device.

4. The fixture of claim 1, wherein the force measurement device is a spring scale.

5. A method of using the fixture of claim 1, comprising the steps of:
    providing an engine having a cylinder bore having an axis;
    providing a first piston ring;
    providing the fixture of claim 1;
    adjusting the expandable platform so that the top surface is large enough to support the piston ring while the platform is small enough to fit within the cylinder bore;
    placing the first piston ring on the top surface;
    inserting the expandable platform with the piston ring thereon within the cylinder bore; and
    pulling on the elongate member to pull to the platform and the first piston ring from the cylinder bore in the direction of the cylinder bore axis.

6. The method of claim 5, further comprising the step of measuring the force required to pull on the elongate member during the step of pulling on the elongate member.

7. The method of claim 5, further comprising the steps of:
    providing a second piston ring; and
    placing the second piston ring on the first piston ring,
    wherein the step of pulling on the elongate member also pulls the second piston ring from the cylinder bore.

8. The method of claim 5, wherein the arms may be releasably fixed to the plate; and
    wherein the step of adjusting the expandable platform involves rotating the arms in a direction away from the central axis.

9. The method of claim 8, further comprising the step of, after the step of adjusting the expandable platform, fixing the arms in place relative to the plate.

10. The fixture of claim 1 wherein the platform comprises a plate attached to the second end of the elongate member; and first, second and third arms pivotably attached to the plate, wherein first second and third points are located on the first, second and third arms, respectively, and wherein the first, second and third arms pivot about first, second and third axes, wherein first, second and third axes are parallel to and spaced apart from each other and parallel to the central axis.

11. The fixture of claim 10 wherein the plate has a thickness of at least 0.3 inch and wherein each of the first, second and third arms has a thickness of at least 0.3 inch, wherein the thicknesses of the plate and the arms is measured in a direction parallel to the central axis.

12. The fixture of claim 10, wherein the elongate member is a chain.

13. The fixture of claim 10, wherein the elongate member is a rigid stem.

14. The fixture of claim 10, wherein the arms may be releasably fixed to the plate.

15. The fixture of claim 10 wherein each arm has a length and a width, wherein the length is at least twice the width.

16. The fixture of claim 15 wherein each arm has an outer edge along the length that is curved and that is parallel to the central axis.

17. A fixture for measuring the resistance of a piston ring in a cylinder, comprising:

an elongate member having a first end and a second end and a central axis extending therebetween;

a force measurement device fixed to the first end of the elongate member for measuring force in the direction of the elongate axis; and a plurality of arms disposed at the second end, the plurality of arms rotatable outward from the central axis and defining an adjustable flat surface facing towards the first end.

18. The fixture of claim 17 wherein each of the plurality of arms have a curved profile having a circle arc segment and wherein the plurality of arms have a first position in which the circle arc segments of the plurality of arms define arcs of a single circle.

19. The fixture of claim 18 wherein the arms have a thickness of at least 0.3 inches and wherein the circle arc segments of the plurality of arms form surfaces that extend through the thickness and are parallel to the central axis.

* * * * *

UNITED STATES PATENT AND TRADEMARK OFFICE
CERTIFICATE OF CORRECTION

PATENT NO. : 8,479,570 B2
APPLICATION NO. : 12/959958
DATED : July 9, 2013
INVENTOR(S) : Timothy Huttner Page 1 of 1

It is certified that error appears in the above-identified patent and that said Letters Patent is hereby corrected as shown below:

In the Specification

Column 3, Line 62: delete "S".

Signed and Sealed this
Twenty-seventh Day of August, 2013

Teresa Stanek Rea
*Acting Director of the United States Patent and Trademark Office*